UNITED STATES PATENT OFFICE.

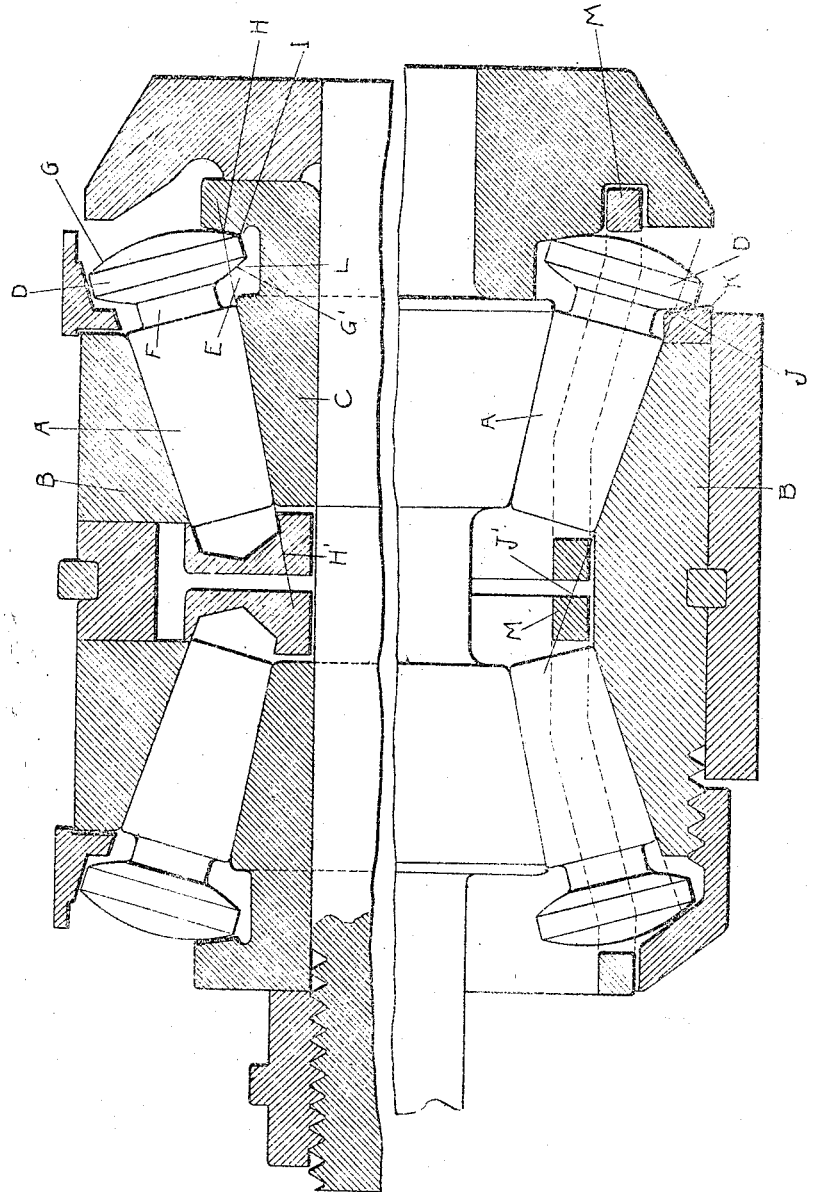

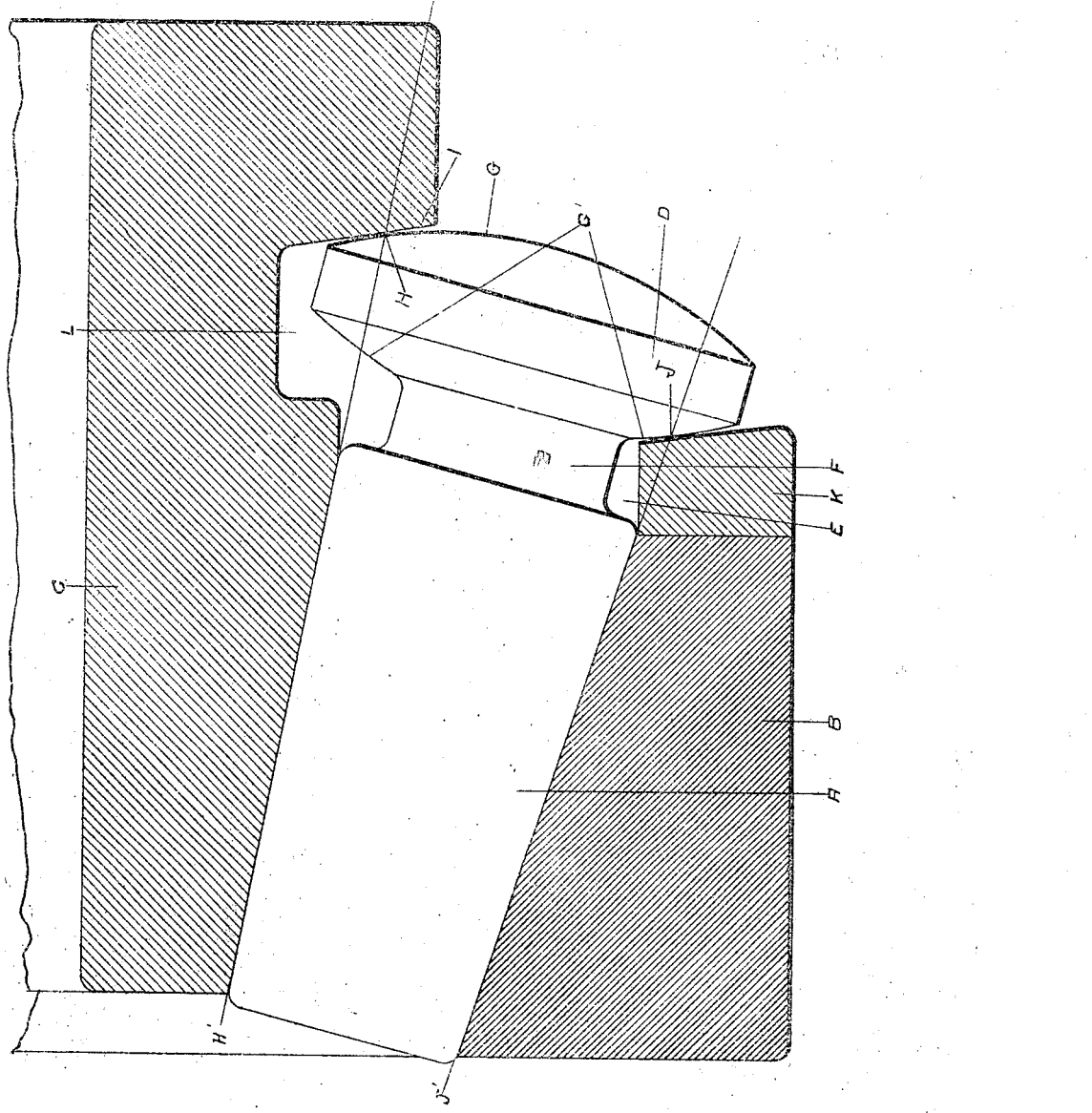

HENRY L. BOCK, OF TOLEDO, OHIO, ASSIGNOR TO WILLIAM EMIL BOCK, OF TOLEDO, OHIO.

ROLLER-BEARING.

1,144,751.   Specification of Letters Patent.   Patented June 29, 1915.

Application filed July 16, 1912. Serial No. 709,734.

*To all whom it may concern:*

Be it known that I, HENRY L. BOCK, a citizen of the United States of America, residing at Toledo, in the county of Lucas and State of Ohio, have invented certain new and useful Improvements in Roller-Bearings, of which the following is a specification, reference being had therein to the accompanying drawings.

The invention relates to roller bearings of the combined radial load sustaining and end thrust type.

It is the object of the invention to obtain a thoroughly practical construction, and one in which the same ratio is maintained between all portions of the surfaces in rolling contact, whereby any interference of one portion with another is avoided.

In the construction of roller bearings designed to both carry radial loads and take care of end thrust, difficulty is experienced in maintaining the same ratio between the relatively moving surfaces, respectively for sustaining the radial load and for the end thrust. On the other hand, where there is differential speed this not only introduces an objectionable frictional element, but also tends to twist the rollers out of alinement. Constructions have been devised in which, when first placed in service, the ratio is the same between all relatively moving surfaces; but these constructions are such that upon wearing of the parts the ratio is changed. I have avoided this difficulty by a construction in which the ratio between the moving surfaces is not only initially the same but will be maintained the same throughout the life of the bearing.

A further feature of my improvement is the reinforcement of the end thrust contacting surfaces so as to reduce the wear to the minimum.

With these objects in view the invention consists in features of construction as hereinafter set forth.

In the drawings: Figure 1 is a longitudinal section through one-half of a roller bearing embodying my improvement; Fig. 2 is a longitudinal section through the opposite half of a bearing embodying my improvement, showing a form of bearing of slightly modified construction; and Fig. 3 is an enlarged diagram showing the principle of construction.

A are conical rollers arranged concentrically about coöperating conical outer and inner race members B and C.

D are heads at the large ends of the rollers, which are of greater diameter than the extension of the cone, and are preferably separated from the radial bearing portion by grooves E and neck portions F of reduced diameter. The opposite sides of the head D have curved or spherical surfaces G and G', which are adapted to contact with end thrust bearings upon the members B and C. The surfaces on the latter are arranged at such angles that the point of contact between the same and the contacting spherical surfaces G and G' is in exact alinement with the conical surface of the roller. Thus, as shown, the point of contact H between the surface G' and the surface I of the end thrust bearing lies in the line H H', which is in the surface of the conical roller. In like manner the point of contact J between the inner surface G' and the end thrust bearing K is in the line J J', which lies in the conical surface of the roll. Furthermore it will be observed that the surfaces G I and G' K' extend upon opposite sides of the points of contact H and J, to form reinforcements therefor.

With the specific construction shown, the surface I is formed on an integral portion of the member C, and an annular groove L is arranged between said surface and the conical surface engaging the conical portion of the roller, which groove provides clearance for the head D. The bearing K can be formed either as a portion of the member B or as a separate member; and furthermore this bearing is not essential, as the conical rollers alone will take care of the end thrust in this direction. However, where the bearing K is used the work upon the conical roller is relieved.

To hold the rollers properly spaced and relatively positioned, a suitable cage is provided, such as M, which forms no part of the present invention.

In the drawings, I have shown two opposed roller bearings, each of which is constructed as described, but the bearing may be variously modified according to the specific requirements of the various structures in which it is used.

In operation, end thrust upon the rotatable member will be transmitted through the conical surface C to the rollers and from the latter to the conical race member B. There will however be a wedging action upon the rollers tending to displace the same longitudinally, but this movement is prevented by the contact of the spherical surface G with the tangential surface I, and, as already described, these surfaces being in true rolling contact will not interfere with the freedom of the roller.

What I claim as my invention is:

1. In a roller bearing, the combination of a conical roller and a contacting conical race member having portions provided with opposed, slightly divergent, non-parallel end thrust surfaces contacting in a point which is the projection of the line of contact between the conical surfaces, said non-parallel surfaces both extending upon opposite sides of said point of contact being symmetrically arranged with respect to a straight line passing through said point and being of slight divergence to strongly reinforce the bearing point.

2. In a roller bearing, a roller having a conical surface and a head at the large end of said roller having a spherical surface transverse to and extending upon opposite sides of the projection of said conical surface thereon, and conical race members in rolling contact with said conical roller on opposite sides thereof, the one of said race members whose conical surface forms the more acute angle to its axis being provided with an end thrust surface tangent to and bearing upon the spherical surface of said roller at a point in alinement with the line of contact between said roller and race member.

3. In a roller bearing, a roller having a conical surface and a head at the large end separated from said conical surface by a groove, the surfaces upon opposite ends of said head being spherical, and conical race members engaging said conical roller on opposite sides thereof and being provided with end thrust surfaces extending tangent to and contacting with the respective opposite spherical surfaces of said head at points in projection with the lines of contact of said roller with the respective race members, the said spherical surfaces and contacting end thrust surfaces extending symmetrically upon opposite sides of their points of contact.

In testimony whereof I affix my signature in presence of two witnesses.

HENRY L. BOCK.

Witnesses:
JAMES P. BARRY,
H. E. BOWMAN.